Figures 1, 2:
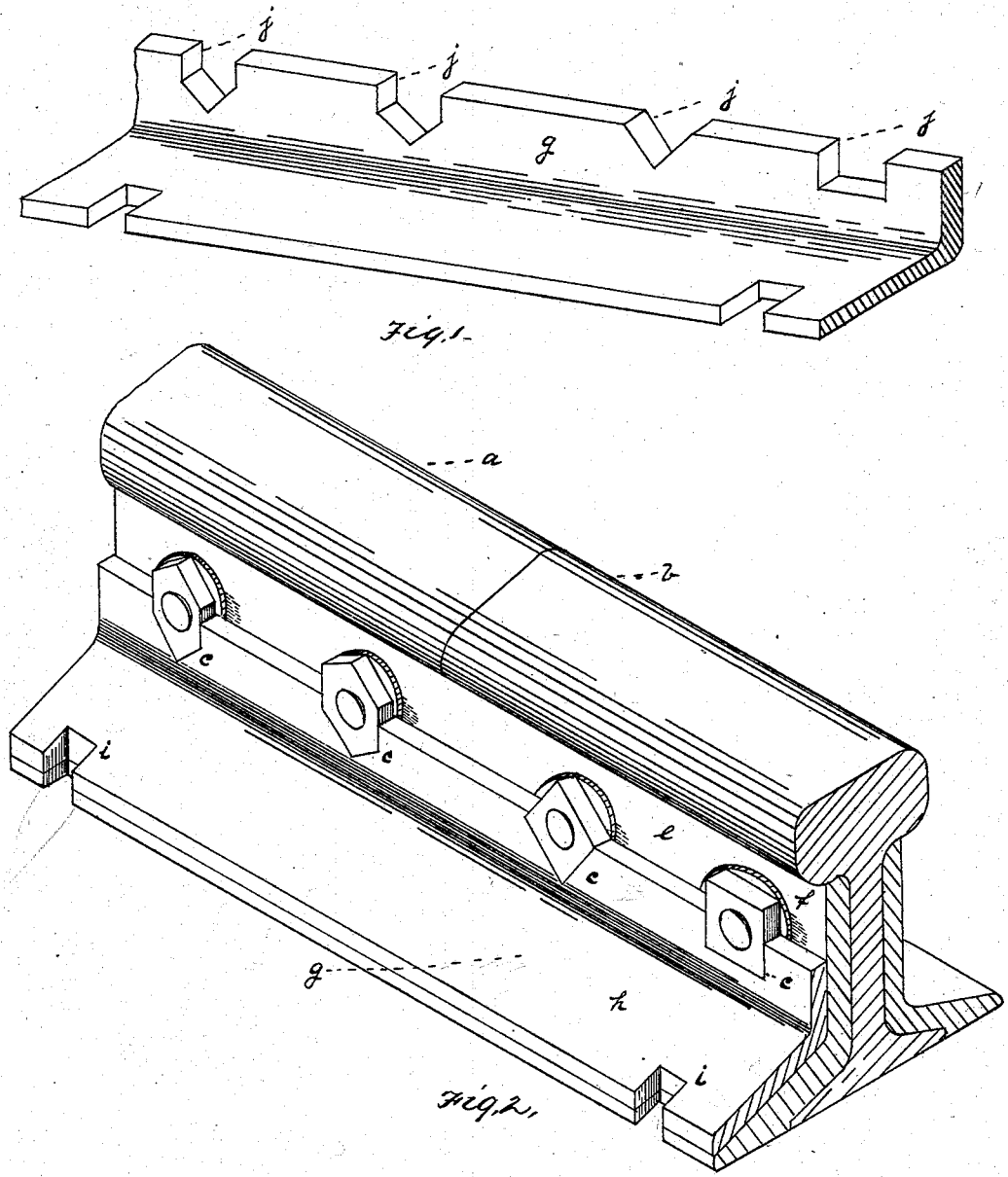

(No Model.)

H. BERLIN.
NUT LOCK.

No. 249,572. Patented Nov. 15, 1881.

Witnesses
Jno. K. Smith
Jas. A. Parlin

Inventor
Henry Berlin
by his attorneys
Bakewell & Kerr

UNITED STATES PATENT OFFICE.

HENRY BERLIN, OF PITTSBURG, PENNSYLVANIA, ASSIGNOR OF ONE-FOURTH TO WM. H. BORMAN, OF SAME PLACE.

NUT-LOCK.

SPECIFICATION forming part of Letters Patent No. 249,572, dated November 15, 1881.

Application filed July 14, 1881. (No model.)

*To all whom it may concern:*

Be it known that I, HENRY BERLIN, of Pittsburg, in the county of Allegheny and State of Pennsylvania, have invented a new and useful Improvement in Nut-Locks; and I do hereby declare the following to be a full, clear, and exact description thereof, reference being had to the accompanying drawings, forming a part of this specification, in which—

Figure 1 is a perspective view of a locking-plate forming one member of my improved nut-lock. Fig. 2 is a like view of the same in conjunction with a flexible or spring washer, or the second member of the nut-lock as applied to railroad-rails.

Like letters of reference refer to like parts wherever they occur.

My invention has for its object a simple and efficient nut-lock; and it consists in a plate or bar having recesses or slots formed in the same, which recesses fit around the nut or a portion of the same, in combination with a flexible washer placed under the nut, adapted to take up the slack, so that it can be brought to a corresponding position with the recesses in the bar or plate without breaking the thread on the bolt.

My invention is especially adapted to use in connection with the nuts which secure the fish-bar to railroad-rails, and this adaptation is shown in the drawings; but I do not desire to limit its use to this purpose, as by a slight modification of the size and shape of the plate it may be adapted for use on trucks, cars, wagons, machinery, and wherever a nut-lock is required.

I will now describe my invention, so that others skilled in the art to which it appertains may manufacture and use the same.

In the drawings, A B represent the two rails; E, the fish-bar; D, the bolts; C, the nuts, and F the washers.

G is a metal plate, somewhat thinner or about the thickness of the nuts C. This plate is bent as shown in the drawings, so as to conform with the fish-bar, the lower portion or foot, H, being of the same extent as the lower portion or foot of the fish-bar, and it is also provided with spike-holes I, which correspond with those in the fish-bar. The upper portion of the plate G may extend to a point even with the center of the bolts D or it may extend to the top of the fish-bar. In the upper portion of the plate G are slots or openings J, which correspond with the size and shape of the nuts.

These parts, which together form my invention, are united as follows: The ends of the rails being placed together, a fish-bar is laid against the sides of the rails, so as to cover the joint. Bolts are passed through holes in the rails and fish-bars, and over the screw end of the bolts are passed flexible washers, made either of rubber, leather, or other suitable material. The nuts are then screwed on the bolts and are brought to an even position, so as to correspond with the slots J in the plate G, the flexible washer yielding to permit the nut to assume the desired position without injury to the thread of the bolt, while at the same time said washer takes up the slack between the nut and the fish-bar or other bearing through which the bolt passes, and thus counteracts the play of the bolt. The plate G is then placed over the fish-bar, so that the nuts C shall engage with the slots J. The plate G and fish-bar E are then spiked to the ties by spikes passing through the holes I.

The upper portion of the plate G will vary in height according to the fish-bars used, and also according to the position of the bolt-holes in the rail. Where the fish-bar is not provided with a foot, but is simply a plain bar, the foot of the plate G then rests on and is spiked directly to the ties.

The purpose of the flexible washers is to enable the workman to give the nuts a half or quarter turn, so as to bring them into position without breaking the thread of the bolt.

The advantages of my invention are, that a simple and efficient nut-lock is produced, which is as durable as the rails and fish-bars, and is a perfect guard to prevent the nuts from becoming loose or detached from the bolts.

I am aware that notched locking-plates have heretofore been employed to prevent the rotation and displacement of the nut; and I am also aware that flexible spring-washers have been used to prevent the vibration of the bolt, which tends to the displacement of the nut, and do not herein claim such elements separately applied for such purposes, for the reason that where the locking-plate is used alone the nut must either be screwed very tight or forced down to bring it into position to enter the notches of the locking-plate, and thus the threads of the bolt or nut may be injured, unduly weakening the connection, or the nut must not be fully screwed home, and thus the tendency to vibration remains and a close connection of the parts held by the bolt is not effected; but I am not aware that a spring-washer has been combined with a bolt, nut, and locking-plate, as herein specified, to permit the proper adjustment of the nut for the reception of the locking-plate, and this without injury to the threads of the bolt or nut and without leaving the bolt at liberty to vibrate; and, therefore,

Having thus described my invention, what I claim, and desire to secure by Letters Patent, is—

1. In a nut-lock, the combination, with the bolt and nut, of a locking-plate having notches to receive the nut and prevent it from turning, and a spring or flexible washer arranged upon the bolt between the nut and the article through which the bolt passes, substantially as and for the purpose specified.

2. In a nut-lock, the combination, with the bolt and nut, of a flanged or angle-iron locking-plate having notches on the two flanges to receive the nut, and a securing-spike and a flexible washer arranged on the bolt, between the nut and the article through which the bolt passes, substantially as and for the purpose specified.

In testimony whereof I have hereunto set my hand.

HENRY BERLIN.

Witnesses:
JAMES K. BAKEWELL,
JAMES H. PORTE.